Dec. 10, 1968   W. HAMILTON   3,415,014
HATCH COVER SYSTEM

Filed April 18, 1966   5 Sheets-Sheet 3

INVENTOR.
WALLACE HAMILTON
BY
McNENNY, FARRINGTON, PEARNE & GORDON
ATTORNEYS

INVENTOR.
WALLACE HAMILTON
BY
McNENNY, FARRINGTON, PEARNE & GORDON
ATTORNEYS

INVENTOR.
WALLACE HAMILTON
BY
McNENNY, FARRINGTON, PEARNE & GORDON

ATTORNEYS

United States Patent Office 3,415,014
Patented Dec. 10, 1968

3,415,014
HATCH COVER SYSTEM
Wallace Hamilton, Bentleyville, Ohio, assignor to McDowell-Wellman Engineering Co., Cleveland, Ohio, a corporation of Ohio
Filed Apr. 18, 1966, Ser. No. 543,140
17 Claims. (Cl. 49—120)

ABSTRACT OF THE DISCLOSURE

A marine hatch cover system is disclosed which includes two horizontally extending panels movable between a closed position over a hatchway and an open position clear of the hatchway. The panels are supported on trackways by rollers located adjacent to each corner of each panel. Power for opening and closing the panels is provided through two closed loop tension members providing oppositely moving substantially parallel reaches. One reach is connected to one panel and the other reach to the other panel so that the panels counterbalance each other. When closed, the panel rollers are positioned over jacking sections which are lowered to lower the panel into the fully closed position. The jacking actuators consist of elongated tubular members which collapse for lowering and are inflated to a substantially round condition for jacking the panels. Dogging is provided by channel shaped dog members which swing into engagement with opposed surfaces on the panels and hatchway.

This invention relates generally to hatch covers and more particularly to a simplified power operated hatch cover system suitable for use on ships or the like.

Because of its simplicity a hatch cover system incorporating the present invention is suitable for use to cover all sizes of hatchways. However, the greatest benefits are realized when the system is used on large ships intended for use as bulk carriers and tankers. The hatchways of such ships are large and the hatch cover panels are necessarily heavy. The use of conventional hatch cover systems in such installations requires large and complicated actuation systems. In addition, when conventional dogging mechanisms are used for such large hatch covers it is necessary to provide a large number of dogging assemblies to withstand the extremely large loads encountered.

During the operation of a hatch cover system incorporating the present invention one panel counterbalances another so that the actuation of the panels does not require large amounts of power. Consequently, a simple and relatively small actuating mechanism provides all of the required power for panel operation. The mechanism for jacking is also simplified to reduce both the initial expense and the operating expense. Still further, the dogging structure is arranged for extremely high load capacity while providing structural simplicity.

The illustrated embodiment of this invention provides two panels which cooperate when in their closed position to cover and seal the hatchway. These panels move horizontally in opposite directions when the hatchway is opened and are connected so that one panel counterbalances the other in the event the ship is listing at the time of actuation. Consequently the power required to actuate the panels is only that power required to overcome friction.

The jacking of the panels is accomplished with actuators consisting of simple flexible tubes which are pressurized when the panels are jacked. Consequently, no dynamic seals or complicated linkages are required in the jacking mechanism. As a result, the initial cost of the jacking system is minimized and maintenance expense is virtually eliminated.

The dogging is provided by simple, elongated, channel shaped elements which are laterally movable into and out of the dogging position. Such elongated, channel shaped elements are capable of withstanding very high loads since they provide a substantially continuous dogging structure throughout their length. They are pivotally supported on the panels so their operation is easily accomplished by merely swinging the channel shaped elements into and out of their dogged position.

It is an important object of this invention to provide a novel and improved power operated hatch cover system arranged for operation with a minimum of power.

It is another important object of this invention to provide a novel and improved hatch cover system consisting of a plurality of panel elements connected so that one panel counterbalances another during the operation of the panels between the closed and opened position.

It is another important object of this invention to provide a novel and improved hatch cover system consisting of a plurality of panels which are horizontally movable in opposite directions when the panels are moved between the opened and closed positions.

It is another important object of this invention to provide a novel and improved hatch cover system according to any of the preceding objects wherein simple cable type drive means are utilized to open and close the hatch cover.

It is another important object of this invention to provide a novel and improved pressure operated jacking mechanism for hatch covers, or the like, which does not require dynamic seals and does not require drive linkages.

It is another important object of this invention to provide a hatch cover system, according to any of the preceding objects, including a jacking mechanism powered by an actuator consisting of an elongated flexible tube inflatable to lift the hatch cover panels.

It is another important object of this invention to provide a novel and improved structurally simple hatch cover dogging mechanism arranged for ease of operation and high structural strength.

It is another important object of this invention to provide a novel and improved dogging mechanism for hatch covers, or the like, consisting of an elongated channel shaped member arranged so that a substantial area of engagement is provided to lock the panels in dogged position.

It is another important object of this invention to provide a novel and improved dogging mechanism, according to the last preceding object, wherein the channel shaped element is pivotally supported for movement between the dogged and released position so that it may be operated with a minimum of effort.

It is still another object of this invention to provide a novel and improved hatch cover system according to any of the preceding objects provided with adjusting means constructed and arranged so that manufacturing tolerances of the basic assemblies need not be closely maintained.

Further objects and advantages will appear from the following description and drawings; wherein, FIGURE 1 is a perspective view, with parts removed for purposes of simplification, of one preferred embodiment of this invention illustrating the hatch cover in full line in its closed position and in phantom line in its opened position;

FIGURE 4 is an enlarged fragmentary perspective view of one dogging assembly;

Figure 1:
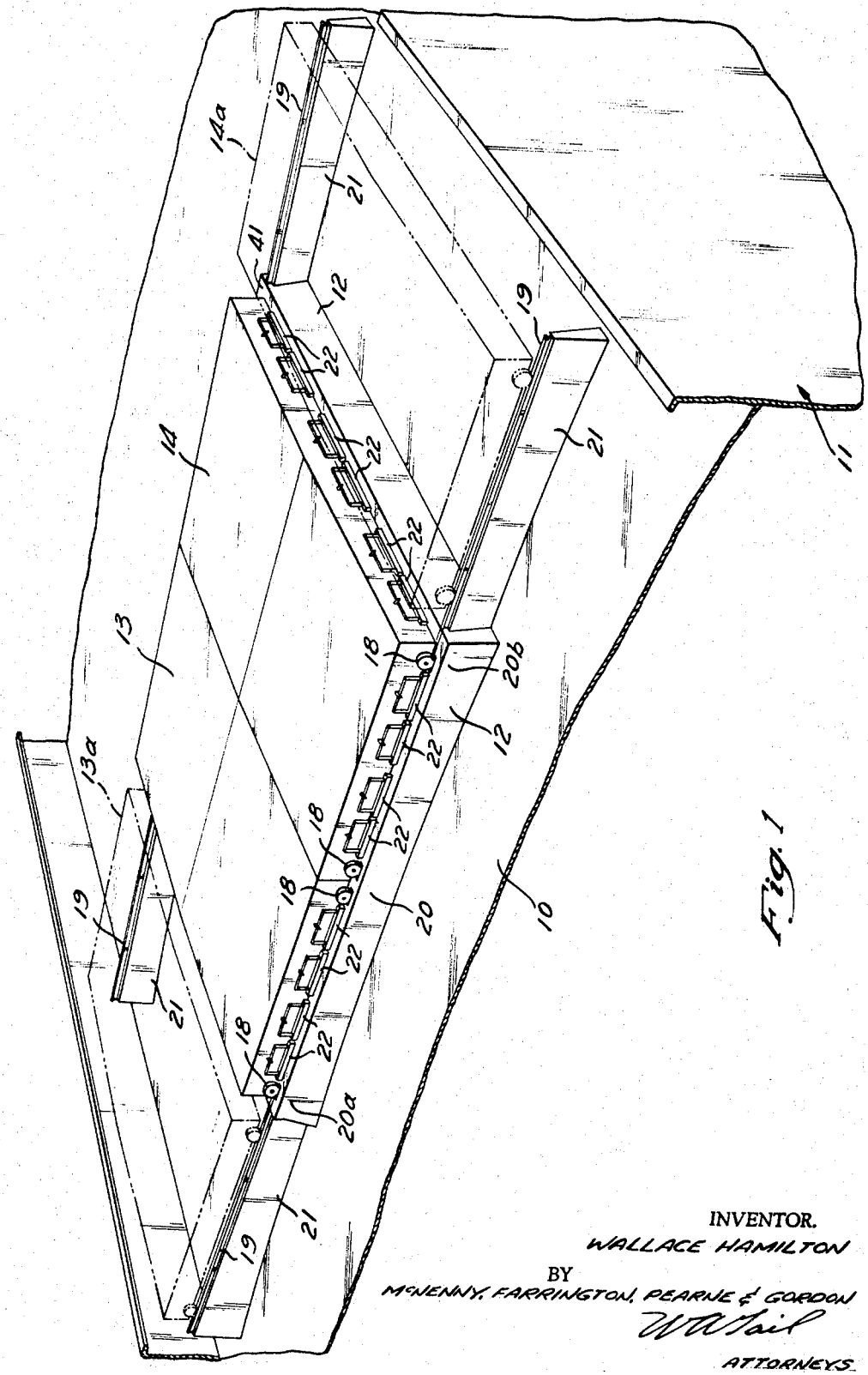

Referring to FIGURE 1, a hatch cover system incorporating the present invention is illustrated installed on the weather deck 10 of a ship 11. A coaming 12 is provided around a hatchway. A pair of hatch cover panels 13 and 14 cover the hatchway and rest on the coaming 13 when they are in the closed position, illustrated in full line. These panels 13 and 14 are movable in opposite directions from the closed position to the opened position illustrated in phantom at 13a and 14a, respectively. When the panels 13 and 14 are in the position 13a and 14a they are clear of the hatchway and positioned over the deck 10 on opposite sides of the coaming 12.

Each panel 13 and 14 is provided with four rollers or wheels 18 with one journaled adjacent to each corner of each panel. A pair of parallel rails 19 extend along opposite sides of the coaming and out over the deck 10. The portions of the rails 19 extending over the deck are supported on suitable support members 21 mounted on the deck 10. Two rollers 18 of each panel 13 and 14 roll along each of the rails or tracks 19 when the panels are operated.

A plurality of dogging assemblies 22 are mounted on each of the panels 13 and 14 along the opposite ends and along the side of each panel remote from the other panel. These dogging assemblies 22 are utilized to lock the panels 13 and 14 in the closed and sealed position.

Each of the panels 13 and 14 is provided with a seal or gasket which extends along the various edges of the panels and provides a fluid-tight joint when the panels are in the closed and sealed position of FIGURE 1. In this position the weight of the panels is supported on fixed bearing pads and shear pads lock the panels against lateral movement. Jacking means are provided to lift each of the panels 13 and 14 vertically so that the panels are raised clear of the shear and bearing pads and so that the seals are separated from their mating surfaces. After the panels have been jacked, power means which are described in detail below are operated to cause the panels to move to their opened positions 13a and 14a. During such movement the panels are clear of all of the restraining structure and free rolling occurs. Therefore, a minimum of power is required to produce the closing and opening movement.

Figure 2:
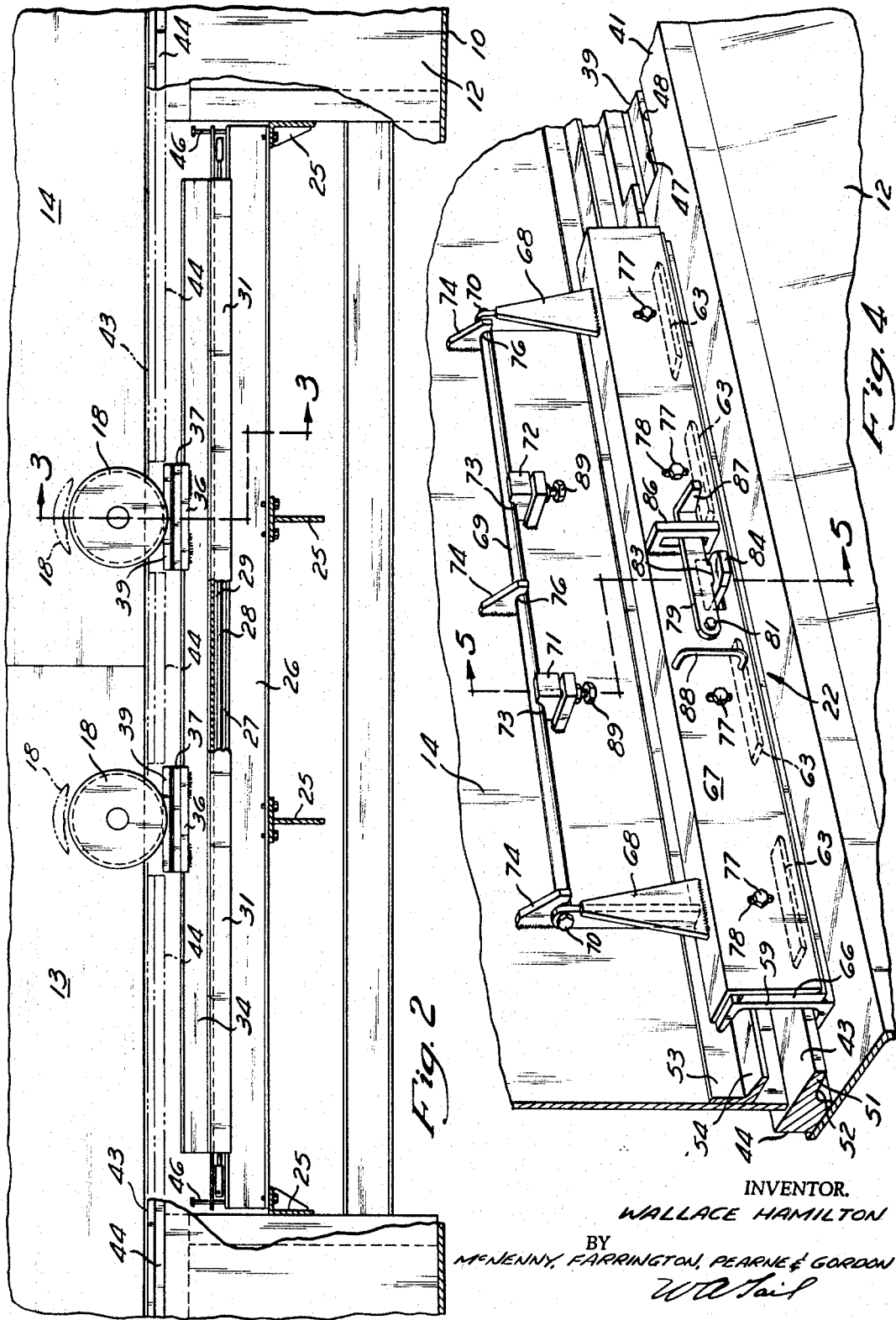
FIGURE 2 is an enlarged fragmentary side elevation partially in section illustrating one of the jacking assemblies.
Figure 3:
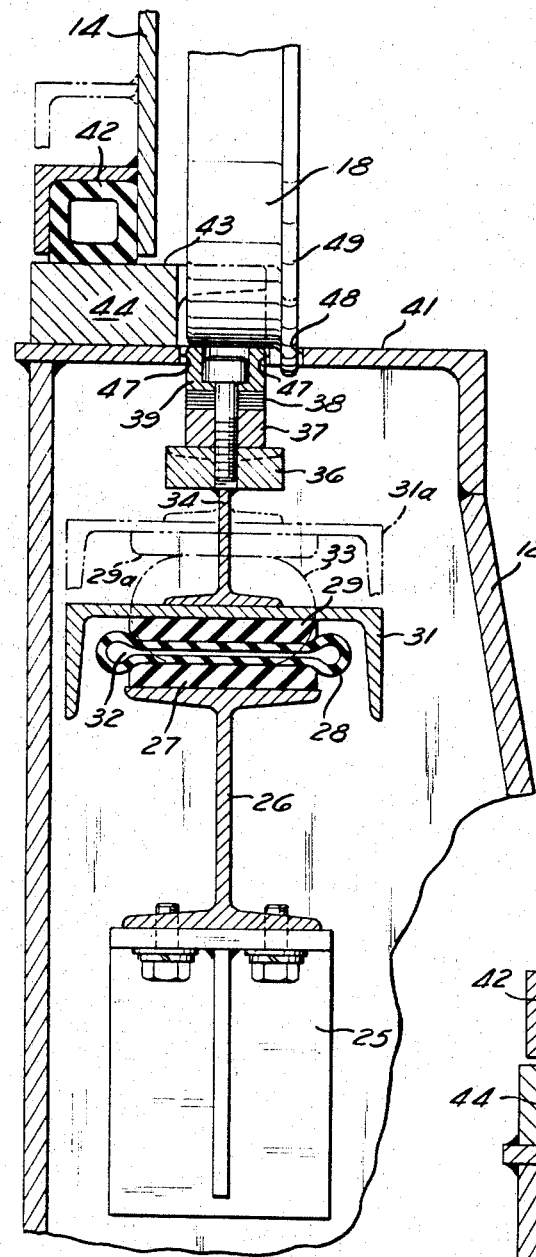
FIGURE 3 is an enlarged fragmentary cross section taken along 3—3 of FIGURE 2 illustrating the structural detail of the jacking assembly.

FIGURES 2 and 3 illustrate the structural detail of the center jacking assembly located at 20 under the two centermost wheels 18. This particular jacking assembly is arranged to raise the two adjacent wheels 18. An identical jacking assembly is provided on the opposite side of the hatchway. In addition, a corner jacking assembly of similar structure and function is provided at 20a and 20b adjacent to the corners of the coaming 12 in a position beneath the outermost wheels 18. The corner jacking assemblies are functionally identical to the center jacking assembly and differ in structure only in that each corner jacking assembly is arranged to jack only one wheel 18 and is, therefore, sized for a smaller load. Thus, there are two center jacking assemblies as illustrated in FIGURES 2 and 3 with one located on each side of the hatchway and four corner jacking assemblies with one located under each of the wheels 18 at the hatchway corners.

Each of the jacking assemblies includes an I beam 26 supported by brackets 25 on the coaming 12. A flexible, tubular actuator 28 is positioned along the beam 26 between upper and lower rubber pads 27 and 29, respectively. The pad 27 is secured along the upper surface of the I beam 26 and the pad 29 is secured to the lower surface of a channel beam 31.

The tubular actuator 28 is preferably formed of reinforced rubber closed at one end and provided with a suitable inlet fitting at the other end. Therefore, the tubular member defines a fluid-tight chamber 32 which can be pressurized or exhausted. When the chamber 32 is exhausted the walls of the tubular actuator 28 collapse under the weight of the beam 31 to the position illustrated in FIGURE 3. However, when the chamber 32 is pressurized the walls move apart and the tubular actuator moves to the shape illustrated in phantom lines 33. This causes the upper pad 29 to be raised to the phantom line position 29a and results in raising the beam 31 to the phantom position 31a Mounted on the channel beam 31 is a second I beam 34 having a mounting plate 36 welded into a cutout portion therein. Mounted on the mounting plate 36 is a spacer member 37, shims 38, and a track section 39. When the chamber 32 is exhausted and the tubular actuator 28 is collapsed the upper surface of the track section 39 is flush with the upper surface 41 of the coaming 12. In this condition the wheel 18 is lowered and the panel 14 is supported by bearing pads described in detail below. In this position a pneumatically inflatable seal 42 engages and seals with the upper surface 43 of a member 44 on the upper surface of the coaming 12. The flange portion of the member 44 provides the section of the track 19 along the coaming.

When the chamber 32 is pressurized the track section 39 is raised until its upper surface is flush with the upper surface 43 of the track member 44 and the wheel is then in position to roll along the track section as the panel moves to the open position. Guiding of the channel-shaped beam 31 is provided by bolts 46 and by engagement between the sides of the track section 39 and the walls 47 of the cutout in the upper side of the coaming 12 through which the track section extends. This cutout is enlarged in a central location at 48 to provide clearance for the flange 49 of the wheel 18. With this jacking structure there are no sliding seals and no drive linkages therefor, initial and maintenance costs are minimized.

The beams and tubular actuator of the corner jacking assemblies are about half as long as the beams and tubular actuators of the center jacking assemblies, since the corner assemblies each lift only one wheel 18. Also, the jacking track sections of the corner assemblies are positioned at the center of the associated beams.

Figure 5:
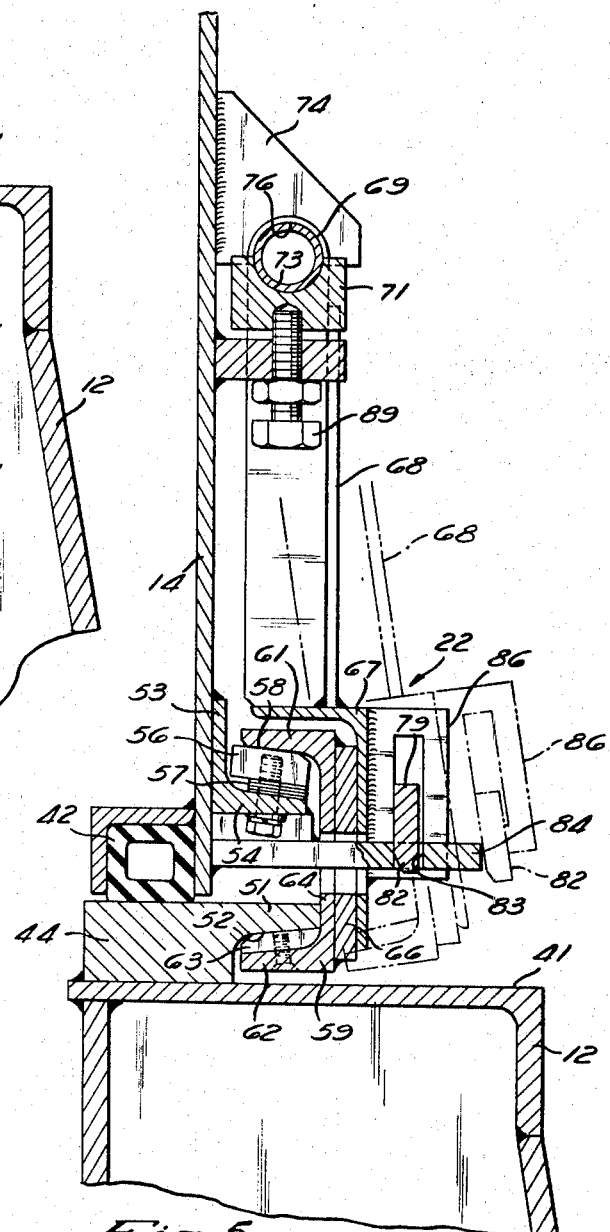
FIGURE 5 is an enlarged fragmentary cross section taken along 5—5 of FIGURE 4 illustrating the structural detail of the dogging assembly.

Reference should now be made to FIGURES 4 and 5 which disclose the structure of the dogging assembly 22. The track member 44 is formed with a laterally projecting lip 51 providing a downwardly facing, laterally extending lower surface 52. An angle member 53 is mounted on the panel 14 to provide a supporting projection 54 for bearing blocks 56. Spacer shims 57 are used to accurately position the bearing blocks 56.

A U-shaped channel member 59 provides the locking action of the dogging assembly 22 when it is in the position of FIGURES 4 and 5. In this position its upper flange 61 extends over the upper surface 58 and a lower flange 62 extends under the surface 52. Bearing plates 63 are mounted at spaced points along the lower flange 62. A plate 66 is welded to the web section 64 to increase the position the bearing blocks 56.

The channel beam 59 is supported by a pivoted frame including an angle member 67, brackets 68 and a tube 69. The brackets 68 are pivotally supported on bolts 70 threaded into the ends of the tube 69. The tube 69 extends across a pair of adjustable blocks 71 and 72 each spaced inwardly from the bracket 68 and each formed with a semicircular, upwardly facing groove 73 proportioned to receive the lower side of the tube 69. Mounted on a panel 14 adjacent to each of the brackets 68 and in a central position therebetween are upper plates 74. Each of the upper plates 74 is formed with a downwardly facing, semicircular groove 76 embracing the upper side of the tube 69. The blocks 71 and 72 cooperate with the plates 74 to support the tube 69. This particular pivot mounting structure permits limited upward movement of the panel 14 relative to the angle member 67 without overstressing any of the elements. In such an event the tube 69 merely bends within elastic limit and prevents excessive loads on the pivot structure.

The channel member 59 is mounted on the angle member 67 by means of bolts 77 which extend through elongated slots 78 in the angle member 67. In order to lock the angle member in the locked position a latch structure is provided. This latch structure includes a latch lever 79 pivoted at 81 on the angle member 67. The latch lever 79 is provided with a projection 82 which projects through an opening 83 in a latch bar 84, secured to the panel 14, when the dogging mechanism is locked in the dogged position. A slotted bracket 86 limits the amount of pivotal movement of the latch lever 79.

Release of the latch is achieved by grasping a handle portion 87 and raising the latch lever 79 by pivoting until the projection 82 is clear of the slot 83. A handle 88 is then pulled to swing the dogging assembly out away from the panel to the release position illustrated in phantom in FIGURE 5. At this time the latch lever is dropped and the projection 82 engages the end of the bar 84 to retain the dogging assembly in the release position until redogging is required. Redogging is accomplished by merely grasping the handle portion 87 and lifting the lever until it clears the end of the bar 84. Gravity then swings the dogging assembly back to its dogged or locked position at which time the latching lever is released and dogging is completed.

During installation of each dogging assembly the pivot blocks 71 are adjusted to the proper height by means of bolts 89. The channel member 59 is then adjusted to provide the desired clearance between the upper surface of the bearing plates 53 and the downwardly facing surface 52. The upper bearing blocks 56 are then shimmed to provide a small clearance with the upper leg or flange 61 of the channel member 59. This small amount of clearance is desirable since it prevents the jamming of the dogging member which would prevent easy operation of the assembly. In the event that upward loads on the panels lift the panels the clearance between the bearing member 63 and the rail member 44 is taken up first. Continued upward movement of the panels 14 can occur until the clearance between the bearing member 56 and the upper leg 61 is taken up. During this portion of movement the tube 69 flexes slightly to prevent excessive loads on the pivot structure.

It should be understood that upwardly forces often occur on the panels 13 and 14 when the cargo is either liquid or loose bulk. When carrying such cargos the hatches are filled to the top so that rolling of the ship will not cause lateral displacement of the cargo. Consequently, when the ship rolls the liquid or loose bulk cargo produces a static pressure tending to raise the panels against the dogging mechanism. In many instances this upward force is far greater than the downward force created by the seas washing over the hatchway. For example, the illustrated hatch cover system is designed for use on a large ship and each panel is about thirty feet wide and forty feet long. When crude oil is being transported and the ship rolls to an angle of thirty degrees the upward force may reach two million pounds. Consequently, the dogging assemblies must be able to withstand extremely high loads. With the illustrated dogging assembly these loads can be sustained by four dogging assemblies 22 mounted on each end of each panel and six dogging assemblies across the ends of the hatchway. Dogging and undogging of the hatch cover system is relatively easy, since it is merely necessary for the ship's crew to release fourteen dogging assemblies for each panel. Since the dogging assemblies 22 are arranged for easy release or redogging this can be accomplished quickly and without great effort.

Figure 7:
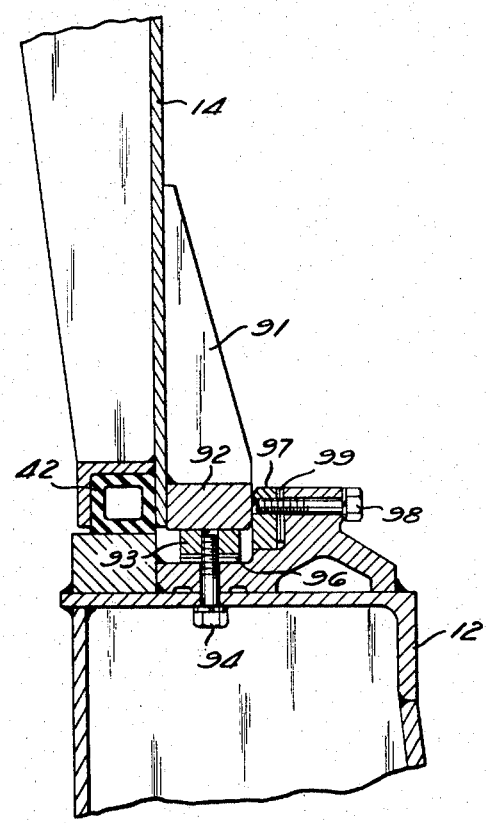
FIGURE 7 is an enlarged fragmentary cross section illustrating one of the shear and bearing pad assemblies which provide vertical and lateral support of the panels when they are in the closed position.

FIGURE 7 illustrates one of the combination shear blocks and bearing supports which are located at the ends of the hatchway. A bracket member 91 is welded to the skirt of the panel 14 and provided with a bearing plate 92 at its lower end. This bearing plate is positioned to rest on a bearing 93 fastened to the coaming 12 by a bolt 94 and adjusted by spacer shims 96. A second bearing plate 97 is positioned to engage the side of the bearing plate 92 and prevent lateral movement of the panel 14. Here again, a bolt 98 and shims 99 are used to secure the upstanding bearing plate 97 in proper position.

The various elements are proportioned so that when the jacking mechanism is exhausted after the panels 13 and 14 are moved to the closed position the panels 14 drop down until the weight of the panels is carried by the bearing plates 93. This same movement causes the bearing plate 92 to move down beside the bearing plate 97. A generally similar shear and rest pad structure is provided at the ends of the panels inboard of the innermost wheels 18. The various shear pads cooperate to lock the panels against all lateral movement.

Figure 7A:
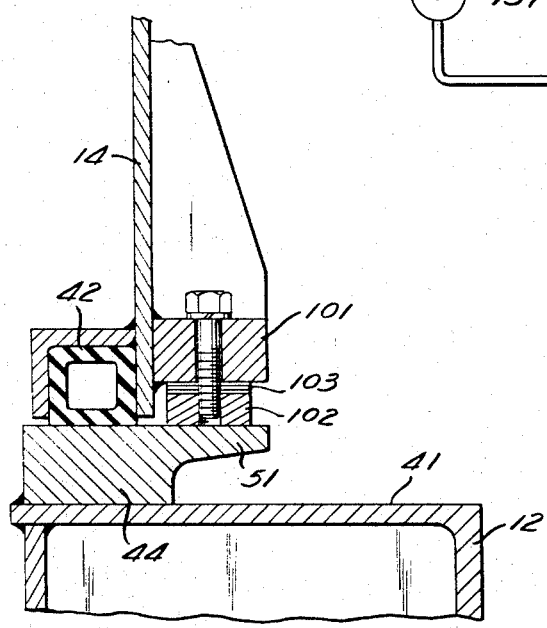
FIGURE 7a is a fragmentary cross section of a side bearing pad assembly.

The rest pads, illustrated in FIGURE 7a, are mounted along the ends of the panels outboard of the innermost wheels 18. In this instance a bracket 101 supports a bearing plate 102 adjustably positioned by shims 103. When the panels are dejacked the bearing plate 102 rests on the upper surface of the track member 44.

Figure 6:
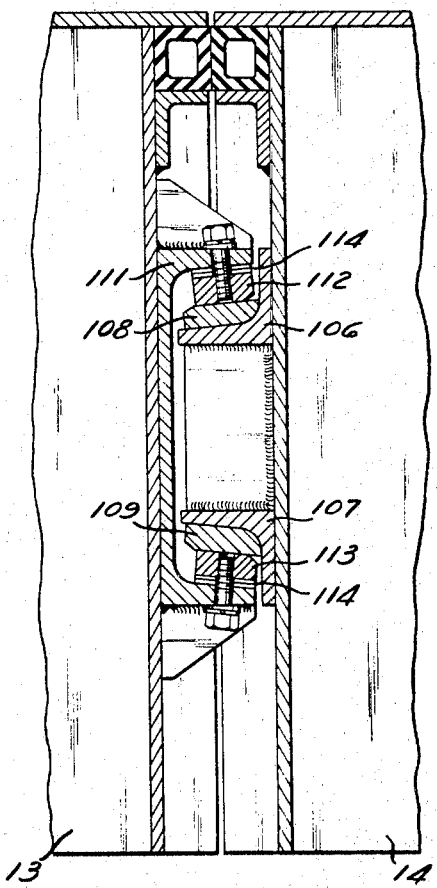
FIGURE 6 is a fragmentary cross section of the interlocking structure at the abutting edges of the panels.

FIGURE 6 illustrates an interlocking structure located at the abutting edges of the panels 13 and 14. This structure is arranged to prevent vertical displacement of the abutting sections of the panels under either upward or downward loads. A pair of angle members 106 and 107 are welded to the panel 14 and provided with upper and lower bearing blocks 108 and 109, respectively. A channel member 111 is secured to the panel 13 and supports bearing blocks 112 and 113. Here again, shims 114 are used to adjust the bearing blocks to proper clearance.

As the panels 13 and 14 move toward each other to the closed position the bearing blocks 108 and 109 are positioned between the associated bearing blocks 112 and 113, as illustrated in FIGURE 6. Consequently, the two panels are locked against relative vertical movement in both directions. Preferably, the structure illustrated in FIGURE 6 is mounted at spaced points along the abutting ends of the panels 13 and 14 with the male and female sections alternated so that the two panels 13 and 14 are identical and can be paired with any other panels on the ship. In this manner left and right type structures are eliminated.

Figure 8:
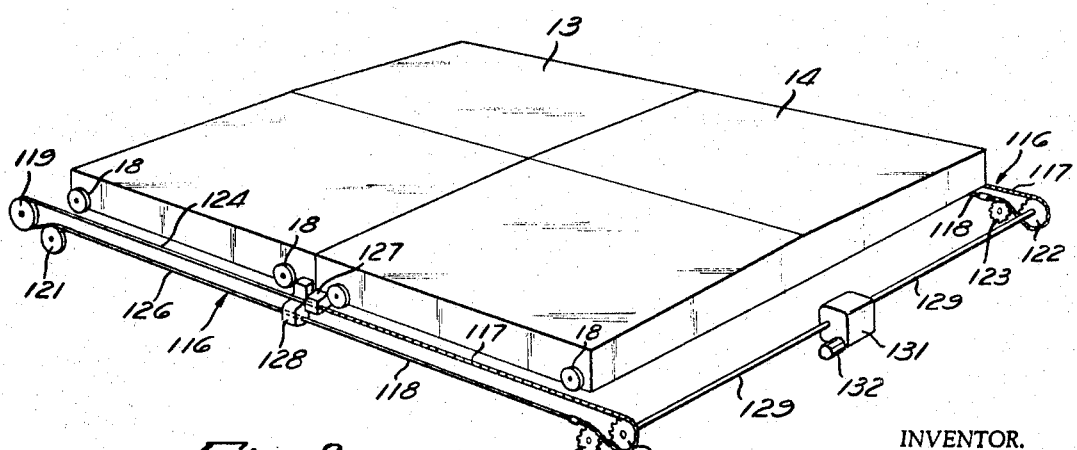
FIGURE 8 is a schematic perspective view of the power actuation mechanism for opening and closing the hatch cover.

FIGURE 8 schematically illustrates the power actuation mechanism for opening and closing the panels 13 and 14. Mounted along opposite sides of the panels 13 and 14 are similar flexible tension members 116. One section 117 of each tension member 116 is formed of a link chain and the remaining sections 118 are preferably formed of wire cable. The two sections 117 and 118 cooperate to form a closed loop extending over idler pulleys 119 and 121 at one end and over a drive sprocket 122 and idler sprocket 123 at the other end. The closed loop provides an upper reach 124 and a lower reach 126. The upper reach is connected to a bracket 127 on the panel 14 and the lower reach is connected by a bracket 128 to the panel 13. When the sprocket drive 122 is rotated in a clockwise direction, as illustrated in FIGURE 8, the upper reach 124 moves to the right and the lower reach 126 moves to the left. Consequently, the panel 14 is moved to the right under this condition and the panel 13 is moved to the left.

Similar drives provided on opposite ends of the hatchway are connected by a cross shaft 129. A gear box 131 and air motor 132 are used to drive the cross shaft 129.

When the ship is on an even keel the panels roll horizontally and the only power required to move the panels is the power required to overcome friction. However, additional power is not required even when the ship lists because one panel counterbalances the other. For instance, when the ship is listing due to unbalanced cargo, or the like, so that the panel 13 moves along an incline in a downwardly direction, the panel 14 moves along the same incline in an upwardly direction. In such instance the panel 13 will tend to roll due to gravity and will supply power to raise the panel 14 up along its incline. Therefore, even under listing conditions the only power required from the motor 132 is the power required to overcome friction. With this drive arrangement a relatively small motor 132 can be used to provide the power for opening and closing of both of the panels 13 and 14 even though the panels are large and heavy.

Figure 9:
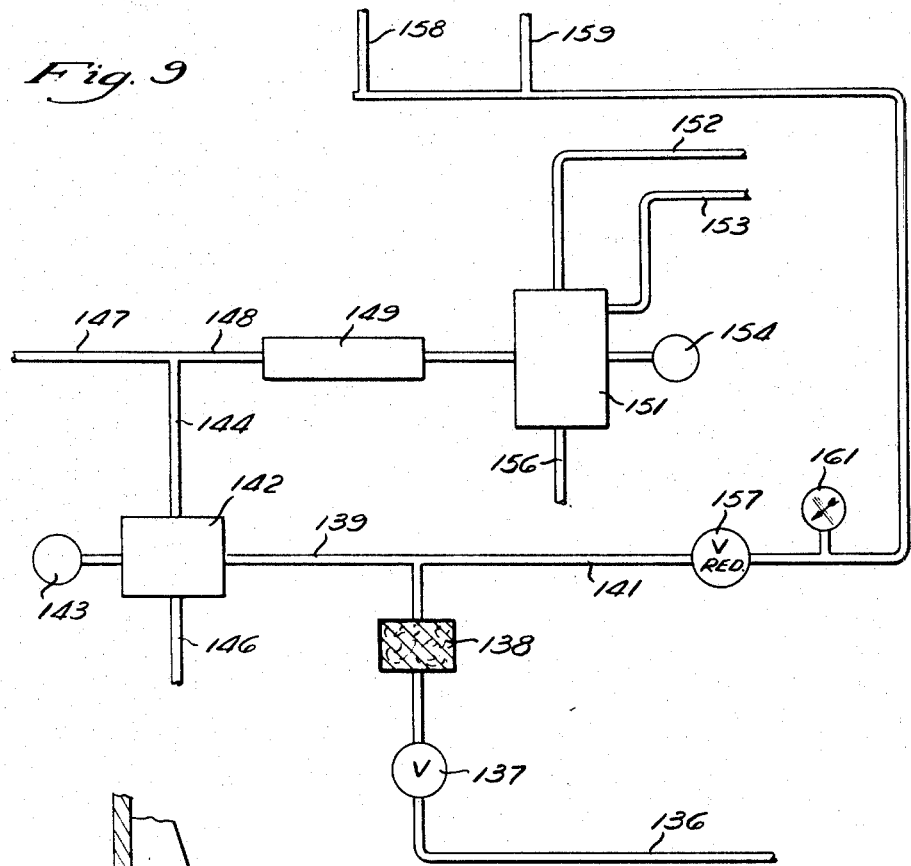
FIGURE 9 is a schematic view of the pressure control system.

FIGURE 9 illustrates, schematically, the control circuit for the operation of the hatch cover system. Compressed air is supplied from any suitable compressor through a supply line 136 to a main shutoff valve 137. From the main shutoff valve 137 the compressed air passes through a filter 138 to one of two branch lines 139 or 141. The branch line 139 connects to a three way valve 142 having an operating handle 143. When the valve handle 143 is in one position, the valve supplies compressed air to a control line 144. In the other position the control line is connected to an exhaust 146. The control line 144 connects to two branch lines 147 and 148. The branch line 147 is connected to all of the jacking actuators 28 and the branch line 148 is connected through a lubricator 149 to a four-way valve 151.

The four way valve is provided with two controlled pressure lines 152 and 153. The valve handle 154 is spring centered. When held in one position the controlled line 152 is connected to the source of compressed air and the control line 153 is connected to the exhaust 156. When held in its other position the connections are reversed, and when released, it is spring returned to its center position which prevents air flow to either line 152 or 153. The two control lines 152 and 153 connect to the air motor 132 so that reversal of the four way valve 151 causes reversal of the motor 132.

The branch line 141 is connected through a pressure reducing valve 157 to a pair of flexible lines 158 and 159. These flexible lines are provided with valved quick-disconnect couplings. The line 158 is adapted to be connected through suitable mating couplings to the pressure seal 42 on the panel 13 and the flexible line 159 is adapted to be connected to the pressure seals 42 on the panel 14. A pressure gauge 161 provides a visual indication of the pressure in the seal circuit.

The opening operation of the hatch cover system is as follows. First, the flexible pressure lines 158 and 159 are disconnected from the respective panels 13 and 14 and all of the dogging assemblies 22 are moved to their released position. Initially the valve 142 is in the position connecting the branch lines 147 and 148 to exhaust.

After the dogging assemlies have been released, the valve 142 is shifted to pressurize both of the branch lines 147 and 148. Compressed air then flows into the jacking actuators and when the jacking action has been completed, the valve 151 is shifted to the opening position which admits compressed air to the motor 132, causing it to operate and move the panels toward the open position. When the panels are fully opened, they are stopped by bumpers located at the end of the tracks 19 and the motor 132 stalls. When the handle 154 is released, it returns to its center position and valve 151 shuts off the air supply to the motor. The panels will remain in this position since they balance each other through the drive system as previously described.

Closing is provided by operating the valve 142 to pressurize the system and shifting the valve 151 to drive the motor 132 in the closing direction. When closing is completed the valve 142 is moved to exhaust the system. This allows the jacking actuators to lower the panels 13 and 14 into their sealed position. The dogging assemblies are then locked and the pressure lines 158 and 159 are connected to the respective panels to pressurize the seals.

It can be seen that since valve 151 receives its air supply from valve 142, it is not possible to operate the drive system unless the jacking system is pressurized.

Although a preferred embodiment of this invention is illustrated, it is to be understood that various modifications and rearrangements of parts may be resorted to without departing from the scope of the invention as defined in the following claims.

What is claimed is:

1. A hatch cover system comprising a hatchway, a pair of panels movable between a closed position over said hatchway and an open position clear of said hatchway, movement of said panels between said closed and open positions being substantially along a plane in opposite directions, power means connected to simultaneously move said panels in said opposite directions, said power means being connected so that said panels counterbalance each other and so that substantially the only power required to move said panels is the power required to overcome friction, said hatchway being substantially horizontal, said panels being provided with an elongated upwardly facing surface, said hatchway being provided with an elongated downwardly facing surface adjacent said upwardly facing surface when said panels are in said closed position, and an elongated channel shaped dogging member is provided to fit over said surfaces and lock said panels in said closed position.

2. A hatch cover system as set forth in claim 1 wherein said dogging member is pivotally supported on said panels for lateral movement with respect to said surfaces.

3. A hatch cover system for ships and the like comprising a generally horizontal rectangular hatchway which tips to positions inclined with respect to the horizontal, said hatchway having opposed sides and ends, track means extending along each of said sides, a pair of rectangular panels, a pair of spaced rollers mounted on each end of each panel for engagement with said track means, said rollers operating to support said panels on said track means for generally horizontal movement between a closed position over said hatchway and an open position clear of said hatchway, a flexible tension member adjacent to each track means, each tension member providing a pair of reaches which extend substantially parallel to said track means, power means located at one end of said hatchway including a drive connection extending across said one end to each tension member, said power means being operable to drive both of said tension members in synchronism with a first reach of each tension member moving in one direction while a second reach of each tension member moves in the opposite direction, said reaches having a length substantially equal to the length of the sides of said hatchway, a first connection between a first of said panels and each first reach adjacent the edge of said first panel closest the second of said panels, a second connection between said second panel and each second reach adjacent the edge of said second panel closest to said first panel, said track means providing a vertically movable track section under each roller when said panels are in said closed position, raising and lowering of said track sections raising and lowering said panels, said hatchway and panels being provided with vertically extending opposed stop surfaces positioned for interengagement to lock said panels against horizontal movement when said panels are in said closed position and when said track sections are lowered to lower said stop surfaces into face-to-face adjacency, said stop surfaces being clear of each other when said track sections are in their raised position so that said panels are free to move along said track means.

4. A hatch cover system as set forth in claim 3 wherein pressure operated actuating means are connected to raise said track sections.

5. A hatch cover system as set forth in claim 4 wherein said actuating means includes a flexible, tubular member below each track section, said tubular members defining a fluid-tight, expansible chamber, fluid pressure in said chamber causing opposed walls of said tubular member to move apart thereby raising the associated track section.

6. A hatch cover system as set forth in claim 3 wherein said power means includes a sprocket drive and said tension member includes a chain section in driving engagement with said sprocket drive, and another section of said tension member is formed of wire cable.

7. A hatch cover system comprising a hatchway, movable panel means operable in one position to cover said hatchway, a first elongated laterally extending surface on said hatchway, a second elongated lateraly extending surface on said panel means overlying said first surface and extending substantially parallel relative thereto when said panel means are in said one position, a dogging beam providing a pair of opposed substantially parallel elongated faces and a wall section connected between said faces adjacent to one edge of each face, said beam being laterally movable into and out of dogging position, one of said faces being positioned in abutting relationship with each of said surfaces when said beam is in said dogging position whereby said panel means are locked against substantial movement in a direction normal to said hatchway, and releasable means to secure said beam in said dogging position.

8. A hatch cover system as set forth in claim 7 wherein bearing pads are positioned at spaced locations along the associated surfaces and faces.

9. A hatch cover system as set forth in claim 7 wherein said beam is pivotally supported for rotation about a pivot axis located so that the arc of beam movement is substantially parallel to said surfaces as said beam approaches said dogging position.

10. A hatch cover system as set forth in claim 9 wherein said pivot is on said panel means.

11. A hatch cover system as set forth in claim 9 wherein clearance is provided between associated faces and surfaces and said pivot is deflectable within the elastic limit of its components to limit loads thereon when said panel means move relative to said hatchway to take up said clearance.

12. A hatch cover system as set forth in claim 11 wherein said pivot includes an elongated rod connected to said beam at spaced locations, and supports engage said rod at spaced points, said spaced points being spaced from said spaced locations.

13. A hatch cover system as set forth in claim 7 wherein said releasable means is a latch operable to selectively retain said beam at said dogging position and in a released position, said faces being laterally spaced from said surfaces when said beam is in said released position.

14. A hatch cover system as set forth in claim 13 wherein said latch means includes a latch element and a bar, said bar including a slot receiving said latch element when said beam is in said dogging position and said latch element engages the end of said bar when said beam is in said released position.

15. A hatch cover system as set forth in claim 14 wherein said beam is pivotally supported on said panel means, said pivot being located so that when said beam is in said dogging position it is lower than when it is in said released position and gravity urges said beam toward said dogging position.

16. A hatch cover system comprising a horizontal hatchway, track means along a side of said hatchway, a movable panel, a roller on said panel operable to roll along said track means and support at least part of said panel as it moves relative to said hatchway between a closed position and an opened position, said track means including a vertically movable track section under said roller when said panel is in said closed position, and an actuator below said track section operable to lift said track section, said actuator consisting of an elongated tube of flexible material sealed at its ends to provide a fluid-tight chamber, said tube collapsing and allowing said track section to lower when said chamber is exhausted and expanding to raise said track section when said chamber is pressurized, said tubular actuator being free of dynamic seals.

17. A hatch cover system as set forth in claim 16 wherein a first beam is mounted in a fixed position relative to said hatchway and a second beam is mounted for vertical movement above said first beam, said actuator being positioned between said first and second beams and extending substantially the full length thereof, said track section being shorter than said actuator and secured thereto intermediate the ends of said second beam.

References Cited

UNITED STATES PATENTS

| 1,877,361 | 9/1932 | Perkins | 114—202 |
| 2,804,039 | 8/1957 | Gray et al. | 114—203 |
| 2,939,450 | 6/1960 | Rubens | 49—121 X |
| 3,200,785 | 8/1965 | Isaksson | 114—203 |
| 3,347,200 | 10/1967 | Mege | 114—202 |

DAVID J. WILLIAMOWSKY, *Primary Examiner.*

J. KARL BELL, *Assistant Examiner.*

U.S. Cl. X.R.

49—123, 212, 221, 235; 114—202.